United States Patent [19]

Hiromoto et al.

[11] Patent Number: 5,267,751
[45] Date of Patent: Dec. 7, 1993

[54] SUSPENSION SYSTEM FOR A VEHICLE

[75] Inventors: Shuji Hiromoto; Roh Kitamura; Fumitaka Yoshino; Takeshi Kamisaku; Toshihiro Takehana, all of Yokohama, Japan

[73] Assignees: NHK Spring Co., Ltd., Yokohama, Japan; NHK Spring Co., Ltd., Yokohama, Japan

[21] Appl. No.: 681,092

[22] Filed: Apr. 5, 1991

[51] Int. Cl.⁵ .............................................. B60G 3/28
[52] U.S. Cl. .................................... 280/691; 280/673
[58] Field of Search .............. 280/688, 663, 664, 673, 280/660, 691, 694, 695, 690, 717, 719, 720

[56] References Cited

U.S. PATENT DOCUMENTS

| | | | |
|---|---|---|---|
| 1,882,484 | 10/1932 | Carpenter et al. | 280/691 X |
| 2,827,303 | 3/1958 | Herbenar | 280/673 |
| 3,892,284 | 7/1975 | Braess et al. | 280/690 X |
| 3,893,701 | 7/9175 | Kroniger | 280/690 |
| 4,334,693 | 6/1982 | Huber | 280/660 X |
| 4,519,628 | 5/1985 | Randle | 280/690 X |
| 4,530,490 | 7/1985 | Misumi et al. | 267/47 |
| 4,546,958 | 10/1985 | Ohno et al. | 267/47 |
| 4,557,550 | 12/1985 | Collard et al. | 280/669 |
| 4,560,525 | 12/1985 | Ryan | 264/136 |
| 4,575,057 | 3/1986 | Robertson | 267/47 |
| 4,613,152 | 9/1986 | Booher | 280/719 X |
| 4,753,835 | 6/1988 | Misumi et al. | 428/74 |
| 4,986,566 | 1/1991 | Nishino et al. | 280/690 X |
| 5,016,903 | 5/1991 | Kijima et al. | 280/663 |

FOREIGN PATENT DOCUMENTS

| | | |
|---|---|---|
| 0213367 | 3/1987 | European Patent Off. . |
| 2601905 | 1/1988 | France . |
| 1-190508 | 7/1989 | Japan . |
| 2-31906 | 2/1990 | Japan . |
| WO90/06454 | 6/1990 | World Int. Prop. O. . |

OTHER PUBLICATIONS

Composite Suspension Combines Three Functions In A Single Part Feb. 1985, No. 2, London, pp. 10–11 from Design Engineering.

News, Engineering 123 Nov. 1990, No. 10, London, article entitled "GKN Composites Leaf Springs Move Up A Weight".

Primary Examiner—Robert P. Olszewski
Assistant Examiner—Dean A. Reichard
Attorney, Agent, or Firm—Frishauf, Holtz, Goodman & Woodward; Frishauf, Holtz, Goodman & Woodward

[57] ABSTRACT

A suspension system comprises front and rear cantilever spring arms. First end portions of the arms are fixed to a vehicle body. Second end portions of the arms extend toward a member for supporting a wheel. The second end portions are connected to each other by means of a curved section. The spring arms are formed integrally with the curved section through the medium of the matrix resin and the fibers so as to be V-shaped as viewed from above. A joint assembly is fixed to the curved section, and a hub carrier is mounted on the assembly.

10 Claims, 10 Drawing Sheets

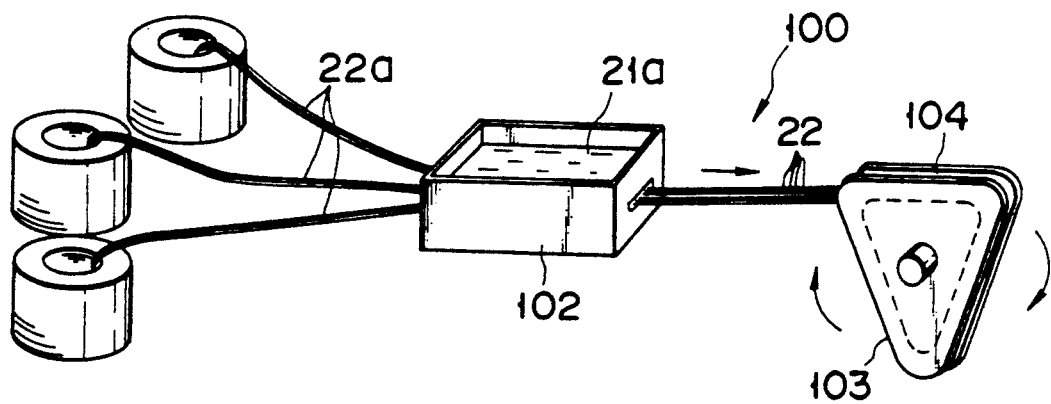
F I G. 7
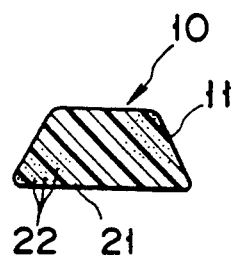
F I G. 8
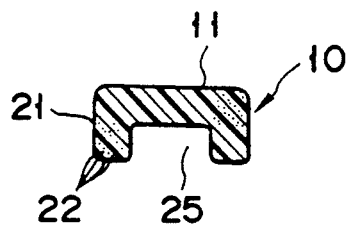
F I G. 9
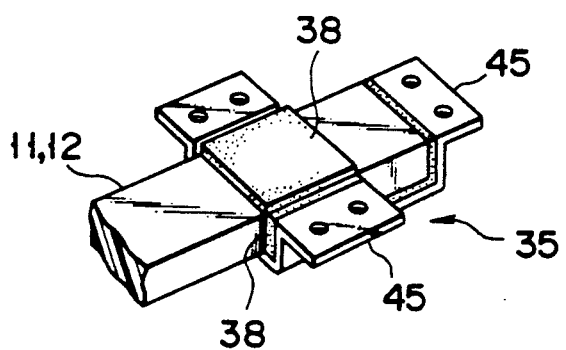
F I G. 10

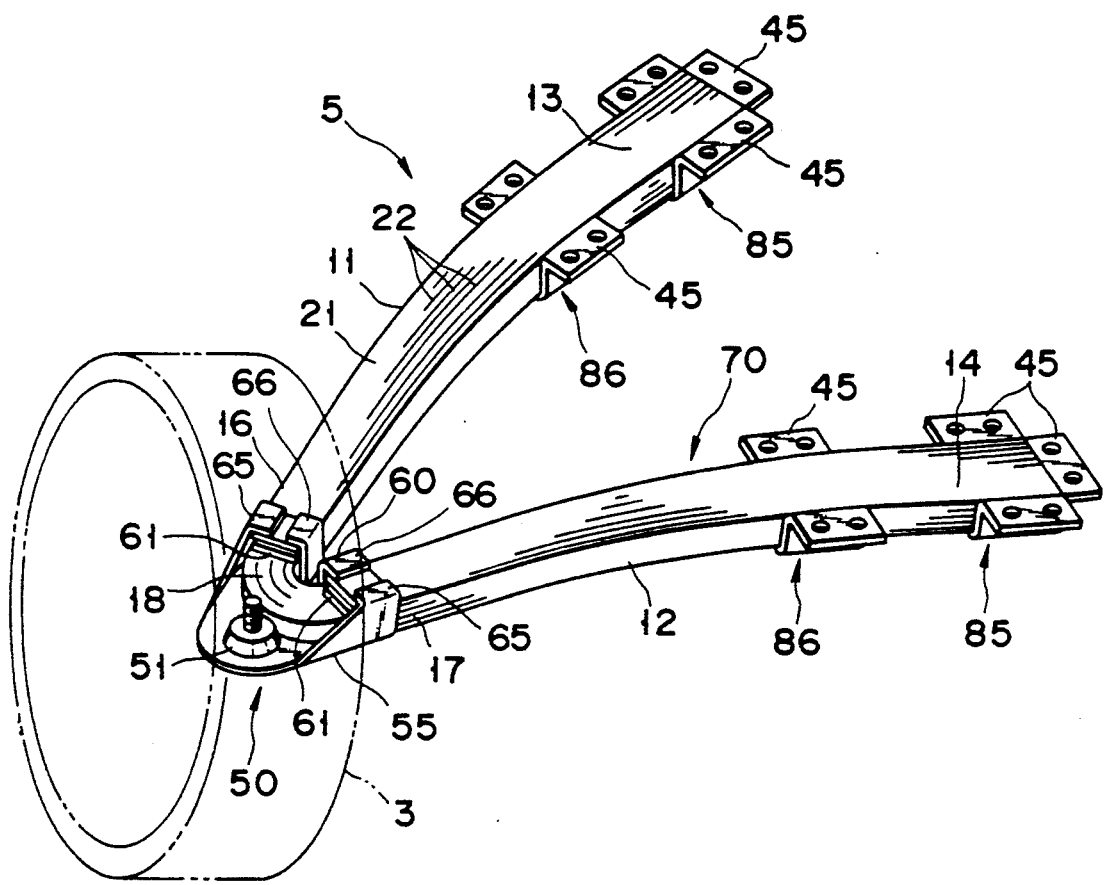
F I G. 15

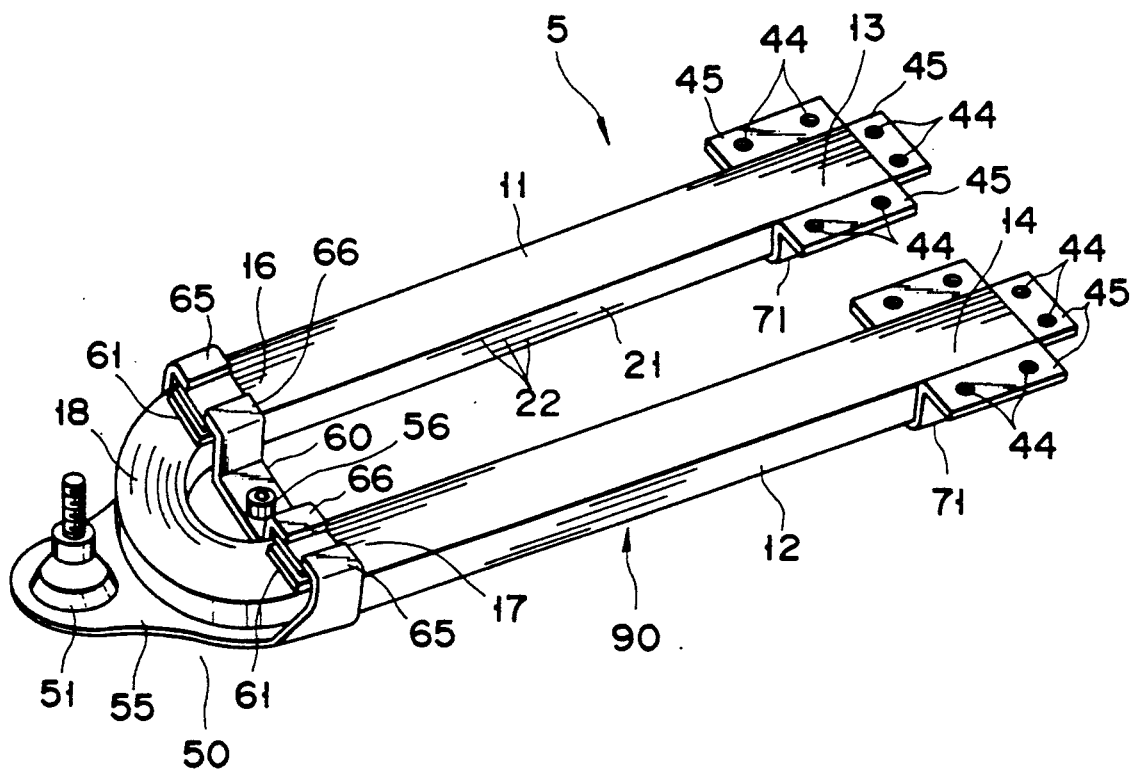
F I G. 16

SUSPENSION SYSTEM FOR A VEHICLE

BACKGROUND OF THE INVENTION

1. Field of the Invention

The present invention relates to a suspension system used in a vehicle such as are automobile.

2. Description of the Related Art

Steel leaf springs or coil springs have conventionally been used as suspension springs for vehicles. Conventional vehicular suspension systems, which are typified by McPherson struts and double wishbones, comprise steel compression coil springs for suspension, used to support the sprung weight, and suspension arms extending in the transverse direction of the vehicle body. The suspension arms, which are rigid bodies, are mounted on the vehicle body by means of pivots so that they can vertically swing around the pivots. A hub carrier is mounted on the distal end portion of each suspension arm.

The suspension coil springs, which are disposed so that their axes extend in the vertical direction, have a great upward projection. Therefore, spaces for storing the upper portions of the suspension springs are needed in the trunk room, engine room, etc. This results in a narrow interior space of the vehicle.

To cope with these circumstances, the inventors hereof have been developing cantilever spring arms to be used in place of the suspension springs. An FRP (fiber-reinforced plastic) spring ar is formed of a matrix resin and fibers. A fixed end of the spring arm is fixed to the vehicle body. A hub carrier or other means for supporting a wheel is attached to a free end of the arm. The spring arm car bend in the vertical direction.

Since the spring arm extends in the transverse direction of the vehicle body, it sometimes lacks in rigidity to stand a load acting in the longitudinal direction. To cope with this problem, the inventors hereof have proposed an arrangement such that a metallic reinforcing rod, for use as a rigid body, is combined with the spring arm. One end of the reinforcing rod is connected to the free end of the arm. The other end of the reinforcing rod is connected to the vehicle body by means of a bracket disposed in front or at the back of the fixed end of the arm. With use of this reinforcing rod, a load acting on the spring arm in the longitudinal or transverse direction can be reduced. If this metallic reinforcing rod is used in a suspension system, however, the whole system is heavy in weight.

If the rigid metallic reinforcing rod is connected to the FRP spring arm, which is not a rigid body, the spring ar should be prevented front being hindered by the reinforcing rod as it bends in the vertical direction. Thus, the junction between the spring arm and the reinforcing rod has a complicated construction.

SUMMARY OF THE INVENTION

Accordingly, the object of the present invention is to provide a suspension system for a vehicle, whose upward projection is smaller than that of conventional suspension systems using suspension coil springs, and which can enjoy substantial strength to bear a load acting in the longitudinal o transverse direction of the vehicle body, despite its light weight.

According to the present invention, which has been developed to achieve the above object, there is provided a suspension system for a vehicle, which connects a vehicle body and axle means for supporting wheels, comprising: a front cantilever spring arm including a matrix resin and fibers embedded in the resin, the first spring arm having a first end portion supported on the vehicle body, a second end portion extending toward the axle means, and a longitudinal intermediate portion situated between the two end portions, and being capable of vertical deflection; a rear cantilever spring arm including a matrix resin and fibers embedded in the resin, the rear spring arm having first end portion supported on the vehicle body, a second end portion extending toward the axle means, and a longitudinal intermediate portion situated between the two end portions, and being capable of vertical deflection; supporting means for supporting the respective first end portions of the spring arms on the vehicle body; and connecting means for connecting the respective second end portions of the spring arms to each other.

In the suspension system of the present invention, the sprung weight is elastically supported by means of the FRP spring arms. A vertical displacement of the wheels, which is caused when the vehicle runs on a rough road surface, is absorbed as the spring arms bend in the vertical direction. The front and rear spring arms cooperatively support a load acting in the longitudinal or transverse direction of the vehicle body. Thus, the suspension system of the present invention can exhibit rigidity as high as that of the conventional ones using the reinforcing rod. Since the vertical size of the spring arm is smaller than that of the conventional suspension systems using the coil springs, the vehicle can enjoy a wide interior space. Since the front and rear spring arms are made of FRP, moreover, they never rust and are light in weight.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a perspective view of an apparatus for effecting the filament winding method;

FIGS. 8 and 9 are sectional views individually showing modifications of a spring arm;

FIG. 10 is a perspective view showing an example in which elastic spacers are used for the bracket shown in FIG. 4;

FIGS. 14, 15 and 16 are perspective views showing third, fourth, and fifth embodiments of the invention, respectively;

DETAILED DESCRIPTION OF THE PREFERRED EMBODIMENTS

Figure 1:
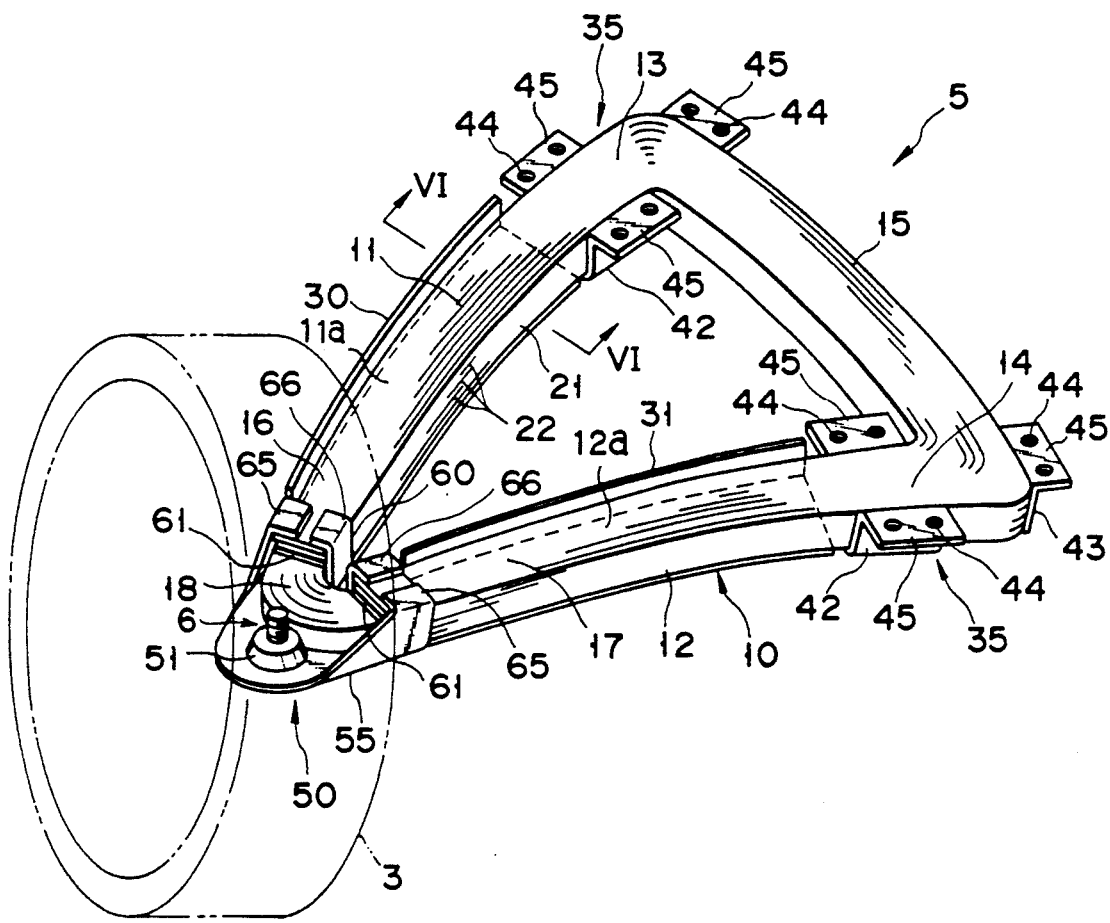
FIG. 1 is a perspective view of a suspension system according to a first embodiment of the present invention.
Figure 2:
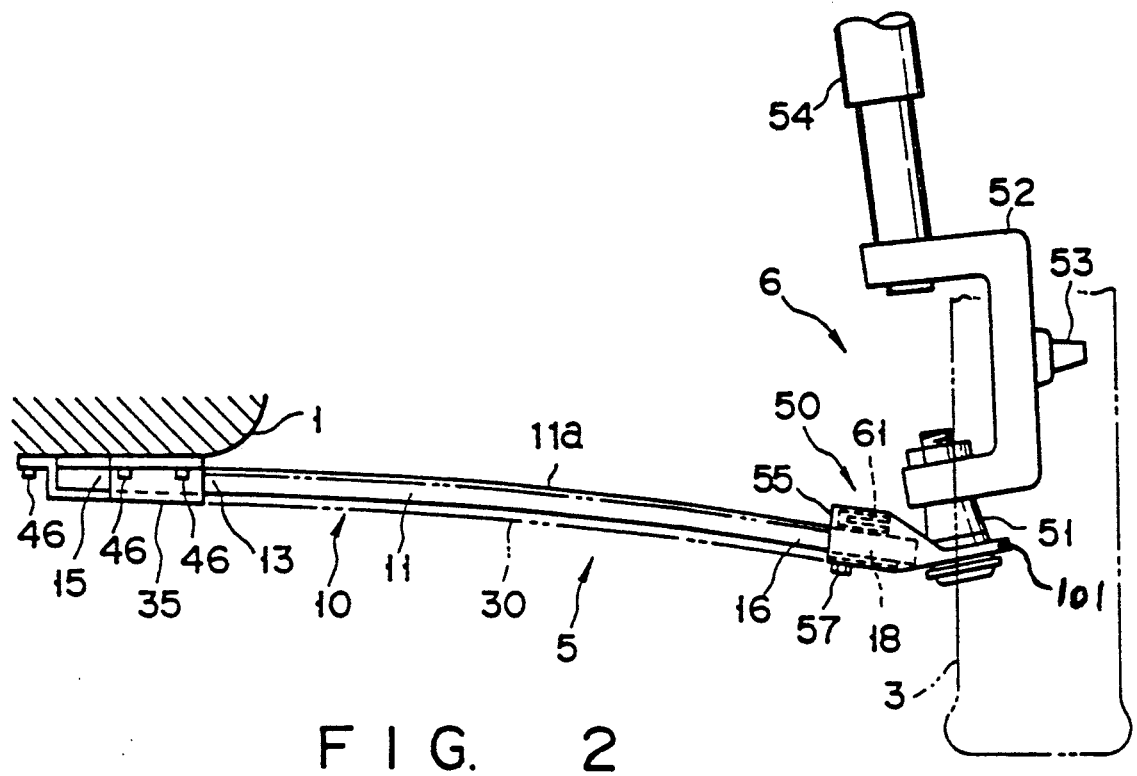
FIG. 2 is a front view of the suspension system shown in FIG. 1.
Figure 3:
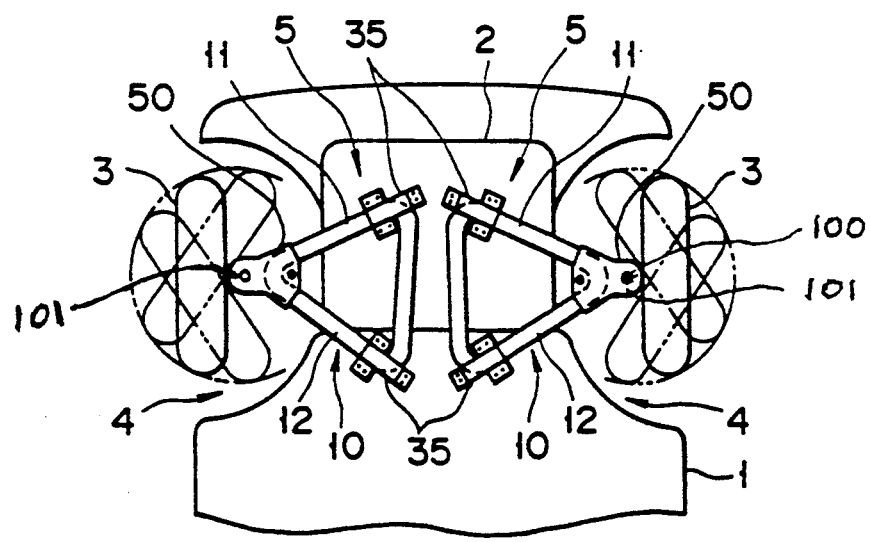
FIG. 3 is a bottom view showing part of an automobile provided with the suspension system shown in FIG. 1.

A first embodiment of the present invention will now be described with reference to the drawings of FIGS. 1 to 6, which show a front suspension system for an automobile. As shown in FIG. 3, an engine room 2 is disposed at the front portion of a vehicle body 1. A pair of front wheels 3 are arranged individually on the right and left sides of the room 2. Each wheel 3, which is contained in a tire house 4, can be turned right and left so as to generate a locus having the shape of a circular arc, as indicated by the two-dot chain line in FIG. 3, by means of a conventional steering linkage (not shown). As shown in FIG. 1, a suspension system 5 is disposed between the vehicle body 1 and a member 6 for supporting its corresponding wheel 3.

The suspension system 5 comprises an FRP member 10, which includes a front spring arm 11 and a rear spring arm 12. The arms 11 and 12 have first end portions 13 and 14 fixed to the vehicle body 1 and second end portions 16 and 17 extending toward the wheel supporting member 6, respectively. Longitudinal intermediate portions 11a and 12a of the spring arms 11 and 12 are situated between the first end portions 13 and 14 and the second end portions 16 and 17, respectively.

The first end portions 13 and 14 are connected to each other by means of a bridge section 15 which extends in the longitudinal direction of the vehicle body 1. The second end portions 16 and 17 are connected to each other by means of a curved section 18.

The spring arms 11 and 12, bridge section 15, and curved section 18 are integrally formed by the figment winding method, using a matrix resin 21, such as epoxy and a large number of unidirectional continuous reinforcing fibers 22, such as glass fibers or carbon fibers. A filament winding apparatus 100 shown in FIG. 7 comprises a tank 102, which contains an uncured matrix resin 21a, and a mandrel 103. As a glass roving 22a formed of a large number of fillers 22 is passed through the tank 102, the resin 21a adheres to the fibers 22. The fibers 22 with the resin 21a thereon are wound around the mandrel 103. The mandrel 103 has a groove 104 on the outer peripheral surface thereof for forming the FRP member 10.

The FRP member 10 is formed by means of the apparatus 100. The fibers 22 contained in the member 10 continuously extend through the spring arms 11 and 12, bridge section 15, and curved section 18 substantially without a break. The fibers 22 are distributed throughout the cross section of the FRP member 10. Since the spring arms 11 and 12 are arranged in the shape of a V, as viewed from above, the wheels 3 cannot interfere with the arms 11 and 12 when they are turned.

Figure 6:
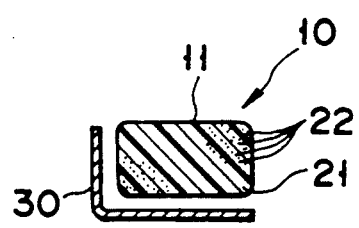
FIG. 6 is a sectional view taken along line VI—VI of FIG. 1.

As shown in FIG. 6, the spring arm 11 has a substantially rectangular cross section. The rear spring arm 12 has the same cross section as the arm 11. The cross section of each spring arm may be trapezoidal, as shown in FIG. 8. Alternatively. a recess 25 may be formed in each arm so as to extend in the longitudinal direction thereof, as shown in FIG. 9. The spring arms 11 and 12 may each be shaped like a taper leaf, with respect to the longitudinal direction, such that their respective second end portions 16 and 17 are thinner than the first end portions 13 and 14, or be shaped so that their width varies in the longitudinal direction.

Each of the spring arms 11 and 12 functions as a cantilever spring. More specifically, those regions which extend from the longitudinal intermediate portions 11a and 12a to their corresponding second end portions 16 and 17 can elastically bend in &:he vertical direction.

Guard plates 30 and 31 are provided near the spring arms 11 and 12, respectively. The plates 30 and 31 serve to prevent stones or some other hard objects, sprung from the road surface, from directly hitting the arms 11 and 12 while the automobile is running. To attain this, the guard plates 30 and 31 are situated in positions which face at least the respective bottom and front faces of the spring arms 11 and 12. The plates 30 and 31 are supported on their corresponding brackets 35 and a joint assembly 50 by means of suitable connecting means (not shown) lest they prevent the arms 11 and 12 from vertically bending. Instead of using the plates 30 and 31, flexible protective sheets may be attached individually on at least the respective bottom and front faces of the spring arms 11 and 12.

Figure 4:
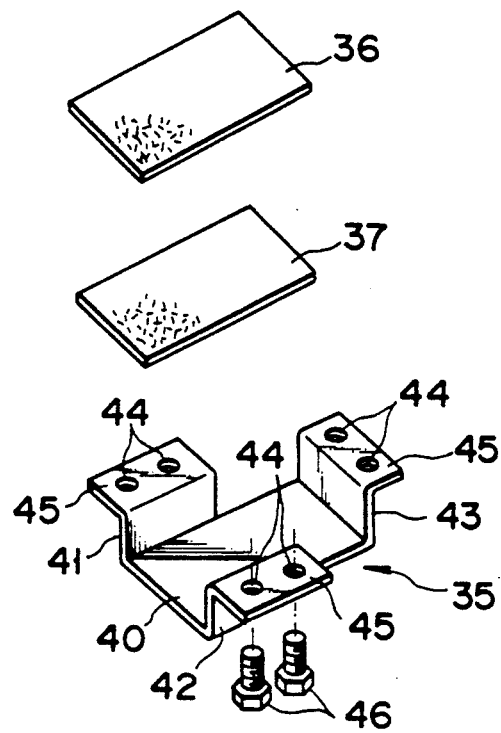
FIG. 4 is a perspective view of a bracket used in the suspension system shown in FIG. 1.
Figure 5:
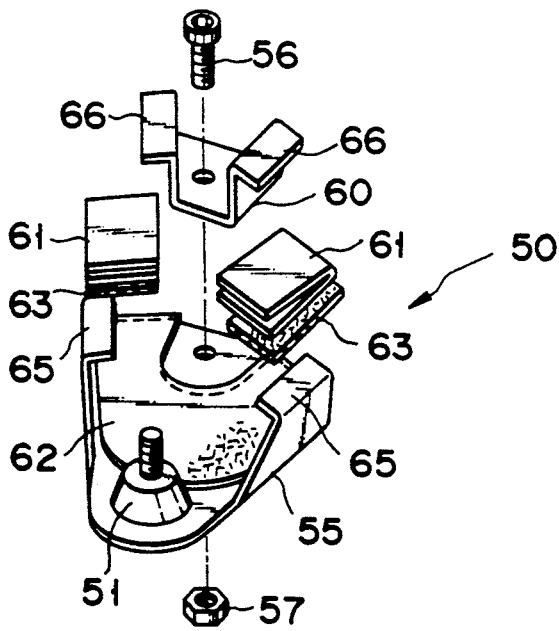
FIG. 5 is an exploded perspective view of a joint assembly used in the suspension system shown in FIG. 1.

The respective first end portions 13 and 14 of the spring arms 11 and 12 are fixed to the vehicle body 1 by means of the metallic brackets 35, as shown in FIG. 4. Spacers 36 and 37 are bonded to the upper and lower surfaces, respectively, of each of the first end portions 13 and 14. Each spacer may be suitably formed of a thermoplastic fiber-reinforced plastic material containing short fibers and having a thickness of about 1 mm. The spacers 36 and 37 serve to prevent the spring arms 11 and 12 from wearing and to equalize surface pressures acting on the arms 11 and 12.

Each bracket 35 includes a plate section 40 superposed on its corresponding spring arm 11 or 12, a pair of rising walls 41 and 42 rising individually from the opposite side faces of the spring arm, a rising wall 43 rising from an end face of the arm, and mounting base sections 45 each having mounting holes 44. A bolt 46 is passed through each hole 44. The brackets 35 are fixed to the vehicle body 1 by means of the bolts 46.

The brackets 35 may be fixed to the vehicle body 1 by means of height adjusting blocks (not shown) so that the respective heights of the first end portions 13 and 14 are substantially equal. As shown in FIG. 10, elastic spacers 38, each formed of a rubbery elastic member, may be interposed between each of the spring arms 11 and 12 and its corresponding bracket 35. The rigidity of the junctions between the vehicle body 1 and the arms 11 and 12 can be adjusted by suitably selecting the degree of elasticity of the spacers 38. The elastic spacers 38 may be also used in the joint assembly 50.

The joint assembly 50 is attached to the curved section 18. A ball joint 51 is fixed to the assembly 50. A hub carrier 52 is turnably supported by means of the joint 51. A shock absorber 54 is mounted on the carrier 52, which is provided with a wheel spindle 53.

The joint assembly 50 comprises a metallic base plate 55, a clamp member 60 fixed to the plate 55 by means of a bolt 56 and a nut 57, wide members 61, and spacers 62 and 63 for preventive the curved section 18 from wearing. Each wedge member 61 is tapered so that its thickness decreases toward its distal end. Each of the spacers 62 and 63 may be suitably formed of a thermoplastic fiber-reinforced plastic material containing short fibers and having a thickness of about 1 mm. The spacers 62 and 63 are bonded to the spring arms 11 and 12.

The base plate 55 of the joint assembly 50 is provided with retaining sections 65 which protrude inward from its top end. The clamp member 60 is provided with retaining sections 66 which protrude outward from its top end. The base plate 55 can be firmly fixed to the curved section 18 by inserting the wedge members 61 between the retaining sections 65 and 66 and the spring arms 11 and 12.

In the suspension system 5 constructed in this manner, the sprung weight is elastically supported by means of the two spring arms 11 and 12 which are made of FRP. The arms 11 and 12 function as suspension springs. Since they are combined in a truss structure, the paired spring arms 11 and 12 can exhibit substantial rigidity to stand forces acting in the longitudinal and transverse directions of the system 5. Thus, use of conventional reinforcing members, such as lateral rods, tension rods, etc., can be lessened or omitted, so that the suspension system 5 can be reduced in weight.

The respective second end portions 16 and 17 of the spring arms 11 and 12 are integrally formed through the medium of the curved section 18. Thus, the joint assembly 50 can be easily mounted on the end portions 16 and 17. In this suspension system 5, moreover, the sprung weight is supported by means of the two arms 11 and 12. Even if one of the arms 11 and 12 is damaged, therefore, the other cannot be damaged thereby. The upward projection of this system 5, using the spring arms 11 and 12, can be made smaller than that of conventional suspension systems which use suspension coil springs.

Figure 11:
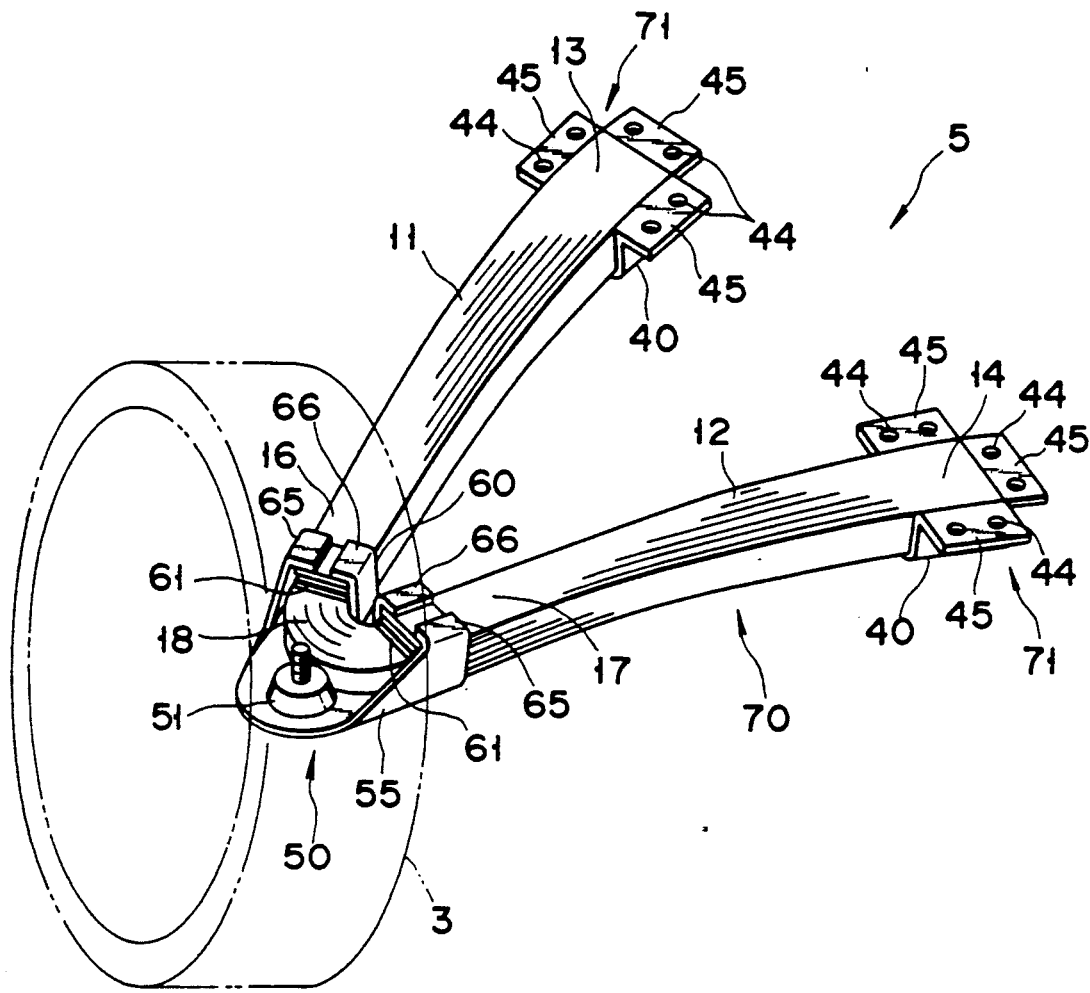
FIG. 11 is a perspective view of a suspension system according to a second embodiment of the invention.
Figure 12:
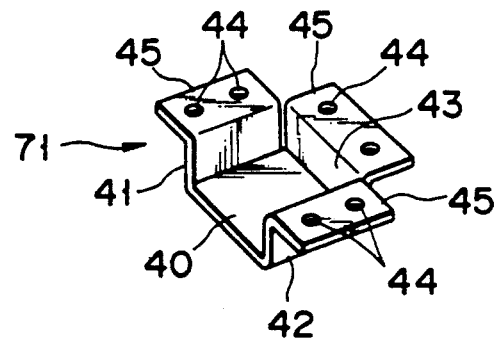
FIG. 12 is a perspective view of a bracket used in the suspension system shown in FIG. 11.

FIG. 11 shows a second embodiment of the present invention. In this embodiment, like or common reference numerals are used to designate the same or common portions as in the first embodiment. An FRP member 70 of the second embodiment, which is not provided with any element which is equivalent to the bridge section 15 described in the first embodiment, is additionally reduced in weight. First end portions 13 and 14 of spring arms 11 and 12 of the second embodiment are fixed to the vehicle body by means of brackets 71, individually, as are illustrated in FIG. 12.

Figure 13:
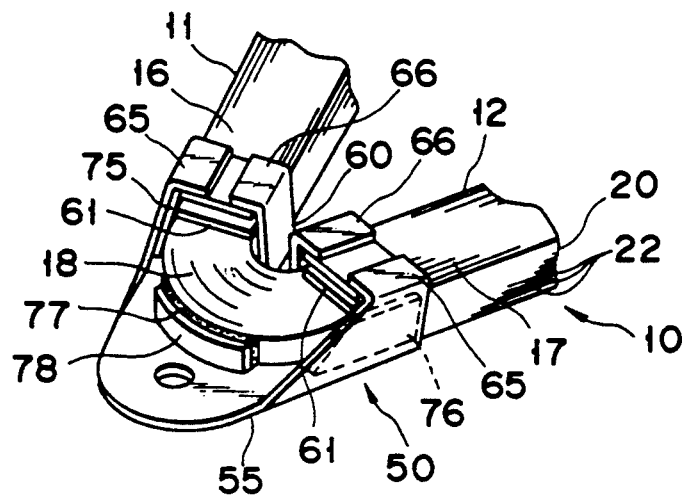
FIG. 13 is a perspective view showing a modification of the joint assembly.

In a modification shown in FIG. 13, elastic spacers 75 and 76, each formed of a rubbery elastic member, are disposed individually between the base plate 55 of the joint assembly 50 and the respective side faces of the spring arms 11 and 12. An elastic spacer 77 is disposed between the curved section 18 and a rising wall 78. With use of the elastic spacers 75 to 77, the rigidity of the junctions between the assembly 50 and the arms 11 and 12 can be adjusted in some measure. The wall 78 is set up on the base plate 55.

Figure 14:
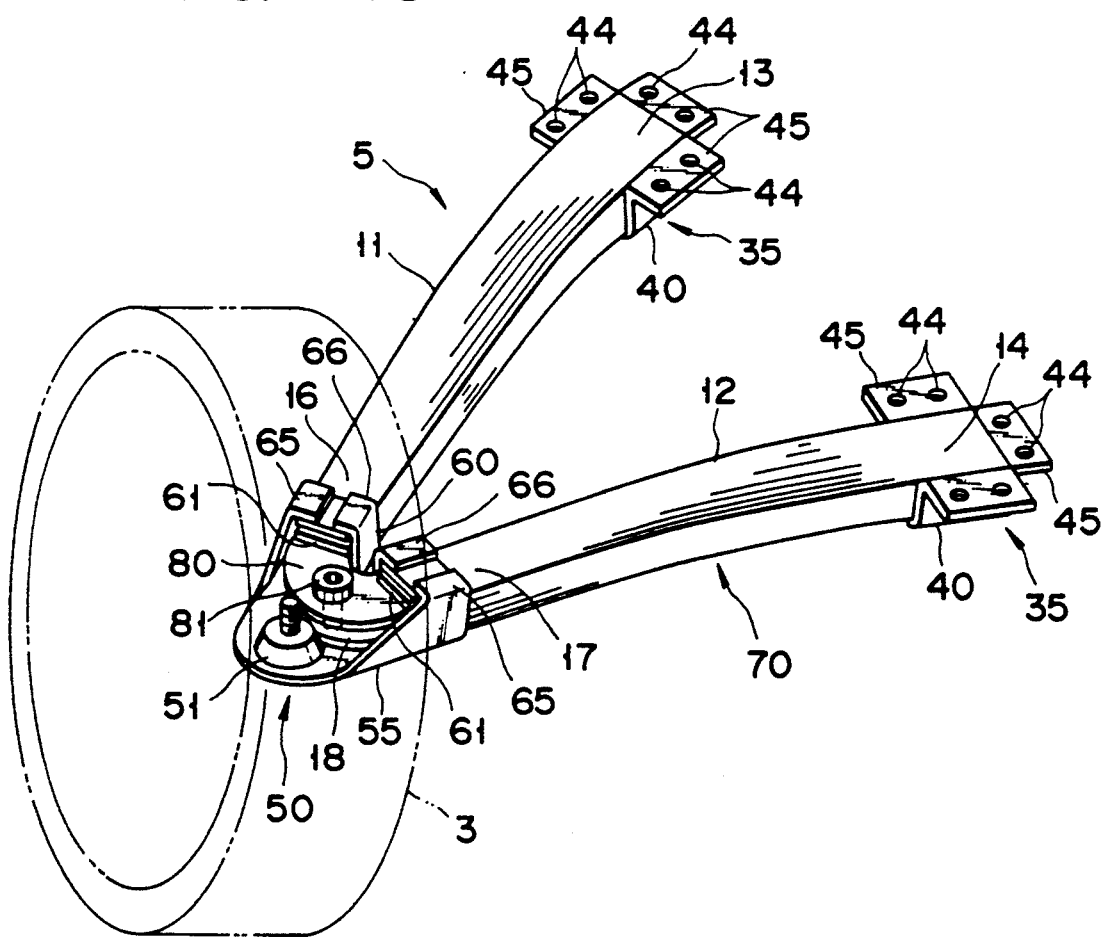

In a third embodiment of the present invention shown in FIG. 14, a curved section 18 is fixed to a base plate 55 by means of a washer plate 80 and a bolt 81. Also, the section 18 is fixed to the plate 55 by means of a clamp member 60 and wedge members 61. Thus, a joint assembly 50 can be fixed to the curved section 18 with higher strength.

In a fourth embodiment of the present invention shown in FIG. 15, first end portions 13 and 14 of spring arms 11 and 12 are fixed to a vehicle body 1 by means of first brackets 85, and longitudinal intermediate portions 11a and 12a of the arms 11 and 12 are supported on the body 1 by means of second brackets 86. If each spring arm is thus supported at two points on the vehicle body, excessive stress can be prevented from being produced in the first end portions 13 and 14.

In a fifth embodiment of the present invention shown in FIG. 16, spring arms 11 and 12 of an FRP member 90 form a U-shaped configuration. A joint assembly 50 is fixed to a curved section 18 of the member 90. The arms 11 and 12 of this embodiment extend substantially parallel to each other. The U-shaped FRP member 90 is obtained by cutting an elliptic FRP product, integrally formed by the filament winding method, in the center with respect to the longitudinal direction.

Figure 17:
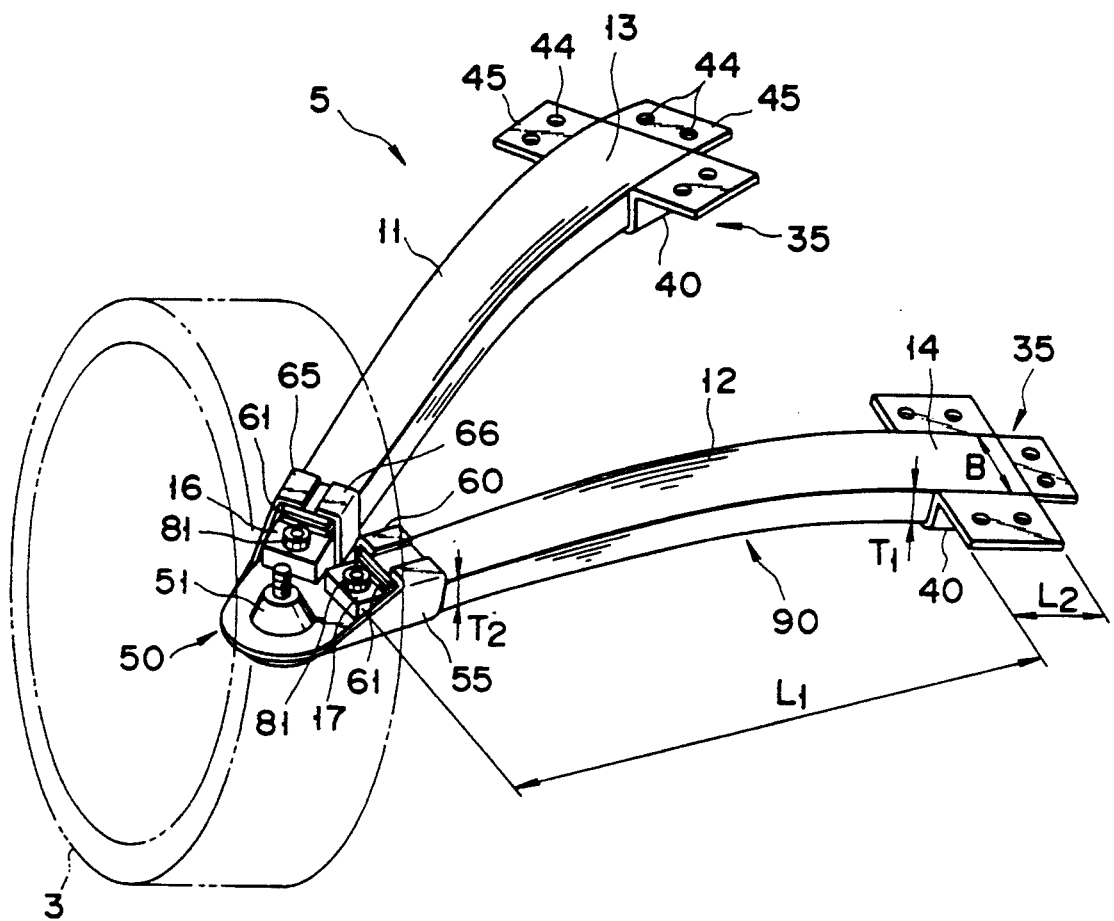
FIG. 17 is a perspective view of a suspension system according to a sixth embodiment of the invention.
Figure 18:
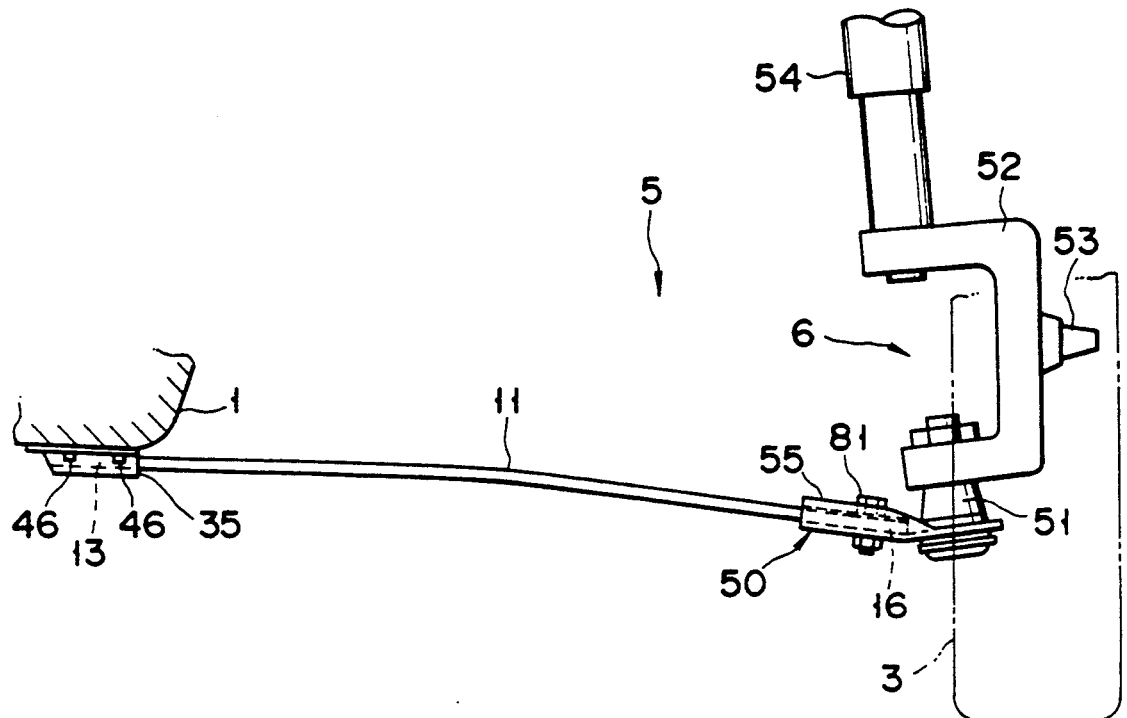
FIG. 18 is a front view of the suspension system shown in FIG. 17.
Figure 19:
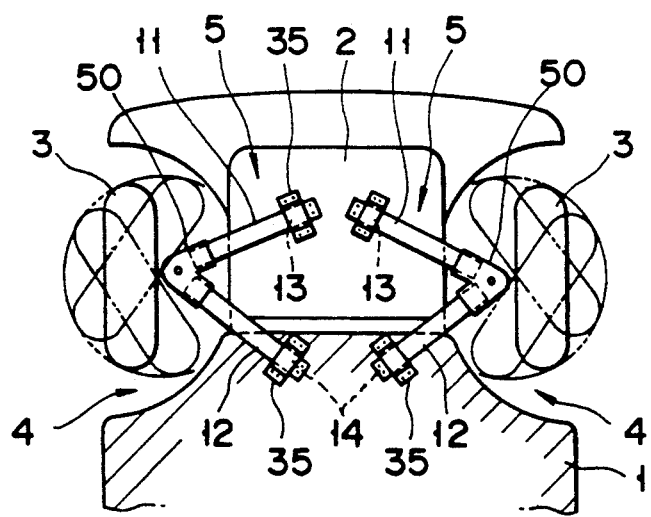
FIG. 19 is a bottom view showing part of an automobile provided with the suspension system shown in FIG. 17.

FIGS. 17 to 19 show a sixth embodiment of the present invention. Two independent spring arms 11 and 12 are connected to each other at their respective second end portions 16 and 17 by means of a joint assembly 50. First end portions 13 and 14 are fixed to a vehicle body 1 by means of brackets 35 and bolts 46. In the case of an automobile with a displacement of 1,000 cc or thereabout, for example, the thickness T1 of each first end portion is 12.2 mm, the thickness T2 of each second end portion is 7.1 mm, and the width B of each spring arm is 39.6 mm. By way of example, moreover, the distance L1 from each second end portion to its corresponding bracket 35 is 505 mm, and the length L2 of each bracket 35 is 100 mm.

As shown in FIG. 19, the front and rear spring arms 11 and 12 are arranged in the shape of a V, as viewed from above, lest they interfere with the locus of turn of a front wheel 3. If the respective spring constants of the spring arms 11 and 12 are equal, the arms 11 and 12 bend to the same degree when a load is applied to the second end portions 16 and 17. Thus, the end portions 16 and 17 can be rigidly connected to the joint assembly 50 without any problem.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A suspension system for a vehicle, which connects a vehicle body and axle means for supporting wheels, comprising:

a front cantilever spring arm including a matrix resin and fibers embedded in the resin, said first spring arm having a first end portion supported on the vehicle body, a second end portion extending toward the axle means, and a longitudinal intermediate portion situated between the two end portions, and being capable of vertical deflection;

a rear cantilever spring arm including a matrix resin and fibers embedded in the resin, said rear spring arm having a first end portion supported on the vehicle body, a second end portion extending toward the axle means, and a longitudinal intermediate portion situated between the two end portions, and being captured of vertical deflection;

supporting means for supporting the respective first end portions of the spring arms on the vehicle body;

connecting means for connecting the respective second end portions of the spring arms to each other; and a joint assembly, having a metallic base plate, fixed to the respective second end portions of the spring arms, said axle means being attached to the joint assembly.

2. The suspension system according to claim 1, wherein the respective second end portions of said front and rear spring arms are connected to each other by means of the connecting means so as to form a V-shaped configuration as viewed from above.

3. The suspension system according to claim 1, wherein the respective second end portions of said front and rear spring arms are connected to each other by means of the connecting means so as to form a U-shaped configuration as viewed from above.

4. The suspension system according to claim 1, wherein said connecting means includes a curved section formed integrally with the respective second end portions of the front and rear spring arms, said curved section having fibers embedded therein so as to be continuous with the fiber in the arms.

5. The suspension system according to claim 4, further comprising a bridge section formed integrally with the spring arms so as to connect the respective first end portions of the spring arms, said bridge section having fibers embedded therein so as to be continuous with the fibers in the arms.

6. The suspension system according to claim 5, wherein said spring arms, said curved section, and said bridge section are integrated as one body by means of said fibers and said matrix resin.

7. The suspension system according to claim 1, wherein said supporting means includes brackets filled individually on the respective first end portions of the spring arms, each said bracket having a plate section superposed on each spring arm, mounting base sections fixed to the vehicle body, and rising walls connecting the plate section and the mounting base sections.

8. The suspension system according to claim 1, further comprising second supporting means for individually supporting the respective longitudinal intermediate portions of the front and rear spring arms on the vehicle body.

9. The suspension system according to claim 8, wherein said second supporting means includes brackets fitted individually on the respective longitudinal intermediate portions of the spring arms and fixed to the vehicle body.

10. The suspension system according to claim 1, wherein said axle means includes a hub carrier and a ball joint for connecting the hub carrier to the base plate of the joint assembly.

* * * * *